(12) United States Patent
Gubba Ravikumar (10) Patent No.: US 12,541,240 B2
(45) Date of Patent: Feb. 3, 2026

(54) CONTROL SYSTEM FOR MITIGATING RECTIFIER CAUSED POWER ANOMALIES IN DATA CENTERS

(71) Applicant: Google LLC, Mountain View, CA (US)

(72) Inventor: Krishnanjan Gubba Ravikumar, Ashburn, VA (US)

(73) Assignee: Google LLC, Mountain View, CA (US)

( * ) Notice: Subject to any disclaimer, the term of this patent is extended or adjusted under 35 U.S.C. 154(b) by 94 days.

(21) Appl. No.: 18/425,669

(22) Filed: Jan. 29, 2024

(65) Prior Publication Data

US 2025/0244816 A1 Jul. 31, 2025

(51) Int. Cl.
| | | |
|---|---|---|
| G06F 1/00 | (2006.01) | |
| G06F 1/28 | (2006.01) | |
| G06F 1/30 | (2006.01) | |
| G06F 1/3203 | (2019.01) | |

(52) U.S. Cl.
CPC ............... *G06F 1/305* (2013.01); *G06F 1/28* (2013.01); *G06F 1/3203* (2013.01)

(58) Field of Classification Search
CPC .................................. G06F 1/305; G06F 1/28
USPC ........................................................ 713/310
See application file for complete search history.

(56) References Cited

U.S. PATENT DOCUMENTS

| | | | | |
|---|---|---|---|---|
| 7,609,040 | B1* | 10/2009 | Jain | ..................... H02M 3/1584 |
| | | | | 323/283 |
| 9,083,232 | B1* | 7/2015 | Agarwal | ............. H03F 3/45183 |
| 9,489,003 | B1* | 11/2016 | O Sullivan | ............... G05F 1/66 |
| 9,891,682 | B1* | 2/2018 | Czamara | .................. G06F 1/266 |
| 10,277,140 | B2* | 4/2019 | Jia | ............................ H02M 1/14 |
| 11,126,255 | B1* | 9/2021 | Sok | ............................. G06F 1/28 |
| 12,160,178 | B2* | 12/2024 | Mukherjee | .......... H02M 1/0009 |
| 2011/0282630 | A1* | 11/2011 | Rikkola | ............. G05B 23/0232 |
| | | | | 702/184 |
| 2015/0113295 | A1* | 4/2015 | Mohr | ...................... H02M 7/04 |
| | | | | 363/52 |
| 2016/0266632 | A1* | 9/2016 | Crawford | ............ H04L 41/0803 |
| 2017/0025969 | A1* | 1/2017 | Xu | ..................... H02M 3/33592 |
| 2017/0271869 | A1 | 9/2017 | Frink et al. | |
| 2018/0183417 | A1 | 6/2018 | Ho et al. | |

(Continued)

FOREIGN PATENT DOCUMENTS

| | | | |
|---|---|---|---|
| CN | 115021739 A | 9/2022 | |
| EP | 3237993 B1 | 8/2023 | |

(Continued)

OTHER PUBLICATIONS

Extended European Search Report for European Patent Application No. 25154451.6 dated Jun. 13, 2025. 10 pages.

*Primary Examiner* — Volvick Derose
(74) *Attorney, Agent, or Firm* — Lerner David LLP (57) ABSTRACT

Aspects of the disclosed technology include techniques and mechanisms for mitigating power anomalies in data centers based on dynamic rectifier threshold values. A rectifier is coupled to a server rack and to a controller. The rectifier has a rate of change of voltage protection (dv/dt) that indicates a change in voltage over time that indicates that an anomaly or transient event has occurred. The controller adjusts the rate of change of voltage protection to account for changes in network conditions, such as for example the amount of power being supplied to a rack which may be indicative of the types of loads being processed by the servers housed in the rack.

20 Claims, 7 Drawing Sheets

(56) References Cited

U.S. PATENT DOCUMENTS

| | | | |
|---|---|---|---|
| 2020/0333384 A1* | 10/2020 | Chen | H02M 7/7575 |
| 2021/0405729 A1* | 12/2021 | Abou-Alfotouh | G06F 1/3206 |
| 2022/0393486 A1* | 12/2022 | Mousavi | H01M 10/441 |
| 2023/0178979 A1 | 6/2023 | Ciesluk | |
| 2024/0094799 A1* | 3/2024 | Li | G06F 1/3206 |

FOREIGN PATENT DOCUMENTS

| | | |
|---|---|---|
| WO | 2023/030605 A1 | 3/2023 |
| WO | 2024018352 A1 | 1/2024 |

\* cited by examiner

CONTROL SYSTEM FOR MITIGATING RECTIFIER CAUSED POWER ANOMALIES IN DATA CENTERS

BACKGROUND

A server rack power distribution system typically uses rectifiers to maintain the stability of loads that are deployed on the server rack (in addition to converting AC power to DC), which in turn impacts the stability of a data center in which the server rack is located. These loads include one or more of computation, storage, networking and machine learning jobs running on servers housed in the racks. A rectifier reads an amount of voltage that the rack pulls from the power supply system of the data center. Rectifiers typically include safety features, one of which is a rate of change of voltage (dv/dt) protection. Among its functions, the rate of change of voltage protection serves as a safety mechanism against transients that could potentially damage internal rectifier components. In some instances, dv/dt protection can become too sensitive depending on a threshold value and other characteristics, such as source impedance and overall system harmonics, for example. The sensitivity can lead to multiple system interactions between the rectifiers, larger power systems, and other components which can potentially lead to significant power anomalies that can impact the reliability and availability of the loads in the data center. If allowed to persist, these power anomalies can result in load loss and impact the availability of the data center itself.

SUMMARY

Aspects of the disclosed technology include methods, apparatuses, systems, and computer-readable media for mitigating power anomalies in data centers based on tracking the state of the power distribution system and dynamically adjusting the dv/dt protection mechanism to account for transients, oscillations and power anomalies. Examples of the components of the power system that can be tracked include power consumption, loading levels, the number of power transformers online, number of rectifiers online (e.g., on a given island of a power system), other loads such Uninterruptible Power Supplies (UPS's), and VFDs that are online. Another aspect of the disclosed technology includes methods, apparatuses, systems, and computer-readable media for tracking the state of the power system to detect one or more power anomalies (impending or just starting) and operate as a feedforward control system that provides the detected one or more power anomalies into an algorithm that corrects the anomalies and eliminates them.

For example, each rectifier has a rectifier threshold value that is associated with a rate of change of voltage protection (dv/dt), which is referred to here as a dv/dt protection parameter. The dv/dt protection parameter provides a measure on a change in voltage over a unit of time that the rectifier detects and may be considered an anomaly if it exceeds a threshold value. In some instances, the system may be configured so that the dv/dt protection parameter is a relatively small value that corresponds to current operating conditions of the system. For example, the servers in a given rack may be performing low density load computations such that a 10 volt change over a time window on the order of milliseconds is an indication of an anomaly. In contrast, if the same servers in that rack are performing high density load computations, a 10 volt change over the same time window may not serve as indication of an anomaly. In this latter scenario, the dv/dt protection parameter can therefore be adjusted to a higher value, e.g., 100 volt change over the same time window, so that the rectifier does not initiate the protection system if a 10 volt spike is detected. In contrast, in systems where the dv/dt protection parameter is static and not adjustable to account for conditions associated with the power system, such systems can become oversensitized or undersensitized depending on the network configuration (e.g., low load density versus high load density).

More generally, the rectifiers are coupled to a controller. The controller monitors a current state of the rack and a rack rating to determine whether to adjust the dv/dt protection parameter. The rack rating indicates a maximum load that the rack can support while maintaining the stability of the rack. Racks that deploy computation, storage, and networking loads are considered low density racks with ratings between 10 to 50 kW. Racks that deploy machine learning loads are considered high density racks with ratings of at least 100 kW. The loads that are deployed on the rack may change over time, thereby changing the density of the rack. As the density of the rack changes, the amount of voltage that the rack uses also changes, thereby reflecting changes in network conditions. The sensitivity of the dv/dt protection parameter may therefore be adjusted to account for changes to the network conditions.

In particular, the dv/dt protection parameter may be either sensitized or desensitized based on changes to the amount of voltage that the rack is expected to pull from the data center when the loads deployed on the rack change. Sensitizing the dv/dt protection parameters includes decreasing the dv/dt protection parameter. Desensitizing the dv/dt protection parameter includes increasing the dv/dt protection parameter. Adjusting the sensitivity of the dv/dt protection parameter has the potential to detect and mitigate against power anomalies that could affect the reliability and availability of the loads deployed within the data center. Such power anomalies, if uncorrected or improperly addressed, could result in load loss and overall data center availability.

In accordance with another aspect of the disclosed technology, the controller monitors certain parameters associated with the rack that are used as part of the feedforward control system. The feedforward control system uses one or more algorithms to correct and eliminate power anomalies that are starting or are actively happening in the power distribution system. The parameters that the controller monitors, independently or when combined, indicate a signature of a power anomaly. The parameters include, but are not limited to, a sag/swell counter from power meters that experience a drastic increase over a predetermined short time frame (e.g., meter counts increase from 3/4/5 events to 30/40/50 or more events in the predetermined short time frame), a significant current imbalance observed within the power system based on monitoring neutral current coming from protective relays, excessive levels of harmonic distortion at multiple frequencies, flat lining of instantaneous phase currents (e.g., on the order of milliseconds) leading to a power anomaly, increases in neutral voltage, or the like. The controller uses the parameters to detect disturbances within the power system. The controller feeds the disturbances into the algorithm. In some instances, the controller monitors analog signals associated with the rack.

One aspect of the disclosure provides for a system for adjusting a rate of change of voltage protection associated with a rectifier, the system comprising: the rectifier coupled to a server rack; a controller coupled to the rectifier and operable to: sense, from the server rack, network conditions associated with the server rack; determine, based on analyzing the network conditions, whether to adjust the rate of change of voltage protection; adjust the rate of change of voltage protection associated with the rectifier; and transmit, to the rectifier, a signal indicating an adjusted rate of change of voltage protection.

In the foregoing instance, the network conditions comprise one or more of: the rate of change of voltage protection associated with the rectifier; a state of network components associated with the server rack; and a density rating of the server rack.

In any one of the foregoing instances, the density rating of the server rack indicates an amount of voltage that loads deployed on the server rack are expected to use.

In any one of the foregoing instances, the state of the network components associated with the server rack comprise one or more of: a number of online network components that are coupled to the server rack; and a number of offline network components that are coupled to the server rack, wherein the network components correspond to transformers and different rectifiers.

In any one of the foregoing instances, adjusting the rate of change of voltage protection associated with the rectifier further causes the controller to: determine whether an amount of voltage used by the server rack increases over time; and based on determining the amount of voltage used by the server rack increases over time, increase the rate of change of voltage protection.

In any one of the foregoing instances, adjusting the rate of change of voltage protection associated with the rectifier further causes the controller to, based on determining the amount of voltage used by the server rack decreases over time, decrease the rate of change of voltage protection.

In any one of the foregoing instances, the rate of change of voltage protection indicates a measure on a rate of change of voltage over a unit of time that the rectifier detects as a power anomaly.

In any one of the foregoing instances, the rectifier is configured to: receive, from the controller, the rate of change of voltage protection; and stop, using the adjusted rate of change of voltage protection, one or more power anomalies within the system.

In any one of the foregoing instances, the controller is further configured to detect, using a feedforward control system, one or more parameters that are indicative of a power anomaly signature.

In any one of the foregoing instances, the controller is further configured to adjust the rate of change of voltage protection based on detecting the power anomaly signature.

Another aspect of the disclosure provides for a method for adjusting a rate of change of voltage protection associated with a rectifier, the method comprising: sensing, by a controller, network conditions associated with a server rack; determining, by the controller and based on the network conditions, whether to adjust the rate of change of voltage protection; adjusting, by the controller, the rate of change of voltage protection associated with the rectifier; and transmitting to the rectifier a signal indicating an adjusted rate of change of voltage protection.

In the foregoing instance, the network conditions comprise one or more of: the rate of change of voltage protection associated with the rectifier; a density rating of the server rack; a number of online network components that are coupled to the server rack; and a number of offline network components that are coupled to the server rack, wherein the network components correspond to transformers and different rectifiers.

In any one of the foregoing instances, adjusting the rate of change of voltage protection further comprises: determining, by the controller, whether an amount of voltage used by the server rack increases over time; and based on determining the amount of voltage used by the server rack increases over time, increasing, by the controller, the rate of change of voltage protection.

In any one of the foregoing instances, adjusting the rate of change of voltage protection associated with the rectifier further comprises, based on determining the amount of voltage used by the server rack decreases over time, decreasing, by the controller, the rate of change of voltage protection.

In any one of the foregoing instances, the method further comprises detecting, by the controller and using a feedforward control system, one or more parameters that are indicative of a power anomaly signature.

In any one of the foregoing instances, adjusting the rate of change of voltage protection is based on detecting, by the controller, the power anomaly signature.

Another aspect of the disclosure provides for a power distribution network comprising: one or more rectifiers coupled to a server rack, each rectifier having a rate of change of voltage protection; and a controller coupled to the one or more rectifiers, the controller configured to: sense, from the server rack, network conditions associated with the server rack; determine, based on analyzing the network conditions, whether to adjust the rate of change of voltage protection; adjust the rate of change of voltage protection associated with the rectifier; and transmit, to the rectifier, a signal indicating an adjusted rate of change of voltage protection.

In the foregoing instance, adjusting the rate of change of voltage protection associated with the rectifier further causes the controller to: determine whether an amount of voltage used by the server rack increases over time; and based on determining the amount of voltage used by the server rack increases over time, increase the rate of change of voltage protection.

In any one of the foregoing instances, adjusting the rate of change of voltage protection associated with the rectifier further causes the controller to, based on determining the amount of voltage used by the server rack decreases over time, decrease the rate of change of voltage protection.

In any one of the foregoing instances, a density rating of the server rack indicates an amount of voltage that loads deployed on the server rack are expected to use.

DETAILED DESCRIPTION

An aspect of the technology described herein addresses mitigating power anomalies in data centers using dynamic rectifier threshold values. In particular, the technology describes dynamically adjusting dv/dt protection parameters based on network conditions. A data center houses a plurality of server racks, where each rack supports a plurality of loads. One or more rectifiers are coupled to each rack to monitor an amount of voltage that is pulled by each load deployed on the rack. The one or more rectifiers are coupled to a rectifier controller (referred to herein as a controller) that is operable to analyze network conditions and rectifier threshold values, and adjust the dv/dt protection parameters.

Figure 1:
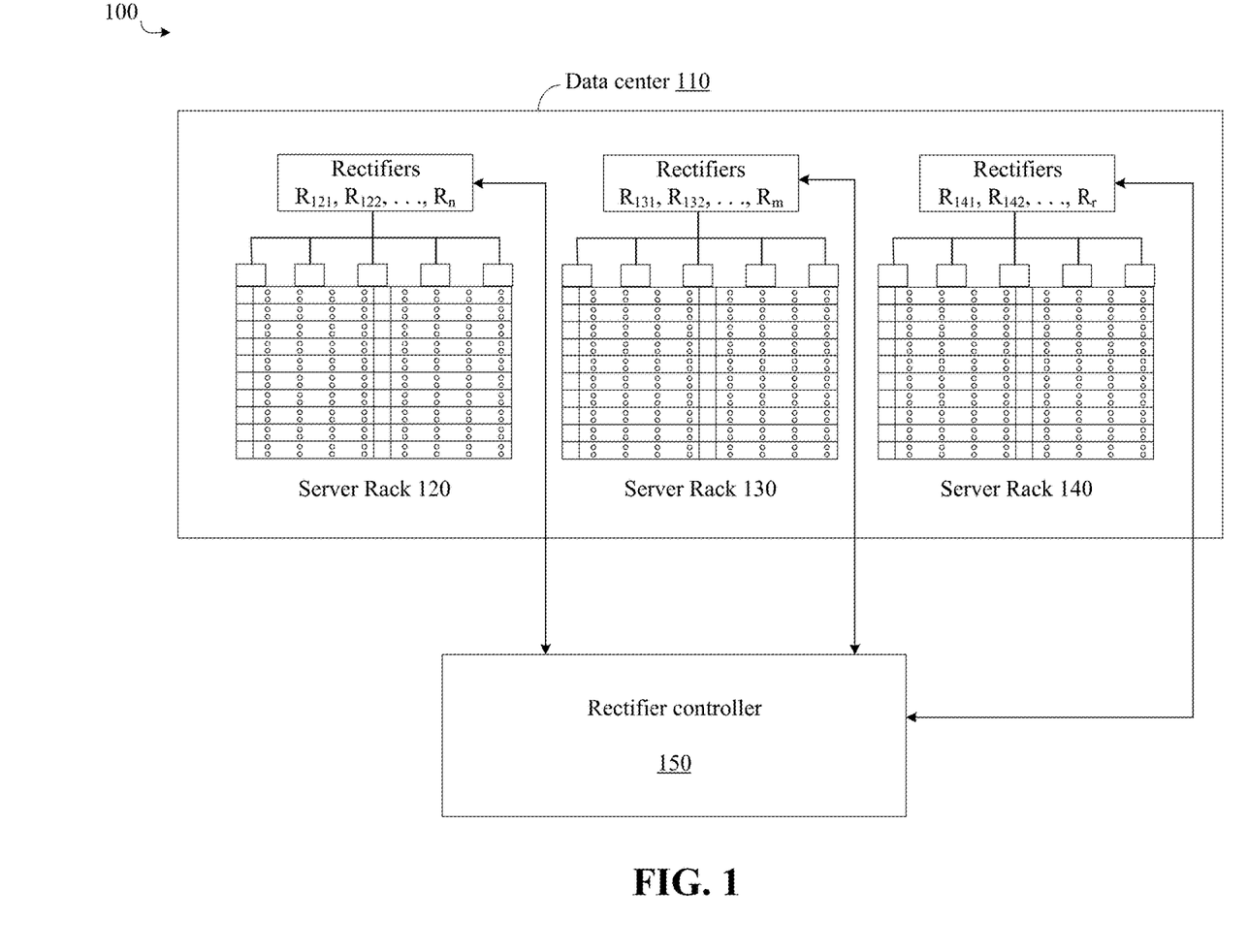
FIG. 1 illustrates an example environment for control systems for mitigating rectifier caused power anomalies in data centers, in accordance with aspects of the disclosure.

FIG. 1 illustrates an example environment for control systems for mitigating rectifier caused power anomalies in data centers. Environment 100 includes data center 110 and rectifier controller 150. Data center 110 may include a plurality of server racks, such as server racks 120-140 (referred to herein as racks 120-140). Each rack deploys a plurality of loads, where each load corresponds to software operations and/or processes hosted by a data center, such as data center 110. Each rack is associated with one or more rectifiers. For example, racks 120-140 include rectifiers $R_{121}$, $R_{122}$, ..., $R_n$, $R_{131}$, $R_{132}$, ..., $R_m$, and $R_{141}$, $R_{142}$, ..., $R_r$, respectively. The rectifiers may be coupled to the racks in different orientations. The rectifiers associated with racks 120-140 are affixed to the tops of racks 120-140 in FIG. 1 for illustrative purposes only, not limitation.

Racks 120-140 each have a rating that indicates an amount of voltage that a load deployed on the rack is typically expected to pull from the data center. A rating is determined in comparison to a threshold voltage value. For example, racks that deploy computation, storage, and networking loads may be considered low density racks with server rack ratings between 10 to 50 kW. Racks that deploy machine learning loads may be considered high density racks with server rack ratings of 100 kW.

The rectifiers associated with racks 120-140 may be single phase rectifiers with ratings between 3 kW to 5 kW. The rectifiers are coupled to rectifier controller 150 (referred to herein as controller 150), which is configured to sense the amount of voltage that is read by each rectifier. Controller 150 receives the voltage readings from the rectifiers and determines whether to adjust the dv/dt protection parameter associated with each rectifier. In some instances, controller 150 may be a power anomaly detection system.

A rectifier threshold value indicates a measure associated with the rate of change of voltage (dv/dt) and is also referred to herein as the dv/dt protection parameter. The rectifiers coupled to the rack monitor the change in voltage over time. The change in voltage over time measures a transient nature of the voltage. The rectifier uses the dv/dt protection parameter to determine whether the rate of change of voltage changes too quickly. In some instances, the dv/dt protection parameter is a minimum voltage reading that, when detected, causes the rectifier to signal that a voltage reading from a load that is deployed on the rack is different from what is typically expected from the load.

When the rectifier determines that the rate of voltage changes too quickly using the dv/dt protection parameter, the rectifier transmits a signal to a power distribution system administrator. For example, when the rate of change of voltage changes faster than the dv/dt protection parameter indicates the voltage should change. In some instances, the rectifier may sense when an amount of voltage that is pulled by the loads running on the rack is greater than the amount of voltage that the rack is expected to use. Based on detecting that a voltage level has changed, controller 150 determines whether to adjust the dv/dt protection parameter. In particular, controller 150 determines whether to sensitize or desensitize the dv/dt protection parameter based on the current network conditions of the rack, as discussed in detail in connection with FIG. 2.

The dv/dt protection parameter may be undersensitized when, for example, the rectifier fails to detect voltage spikes, where a voltage spike indicates a change in network conditions for the loads that are deployed on the rack. The dv/dt protection parameter may be desensitized when the rate of change of voltage causes the rectifier to, for example, not transmit messages or alarms to the controller or other monitoring system. Sensitizing the dv/dt protection parameter may cause the controller to decrease the dv/dt protection parameter, thereby minimizing the range between, for example, the amount of voltage that the rack (or the loads deployed on the rack) is expected to use and the amount of the voltage that the rack (or the loads deployed on the rack) actually uses. This increases the sensitivity of the rectifier by limiting the range of voltage readings that may cause the rectifier to detect an anomaly. Desensitizing the dv/dt protection parameter may cause the controller to increase the dv/dt protection parameter, thereby increasing the range between the amount of voltage that the rack is expected to use and the amount of the voltage that the rack actually uses. This decreases the sensitivity of the rectifier by expanding the range of voltage readings that may cause the rectifier to detect an anomaly.

Determining whether to increase or decrease (e.g., sensitize or desensitize) the dv/dt protection parameter may be based on power system simulations. The outcome of each power system simulation may be stored in a lookup table. The controller is configured to access the lookup table to determine whether to increase or decrease the dv/dt protection parameter. If the dv/dt protection parameter requires modification, the controller uses the lookup table to determine how much to increase or decrease the dv/dt protection parameter. Each power system simulation indicated in the lookup table may correspond to different conditions of the influencing parameters. As the data center power system changes states, it may transition through various pre-programmed lookup table scenarios. In some instances, the dv/dt protection parameter may be increased or decreased on the order of 25V/ms from a starting value, especially in the feedforward method.

Controller 150 dynamically adjusts the dv/dt protection parameter depending on network conditions. Controller 150 transmits the adjusted dv/dt protection parameter to at least one rectifier, such as one of rectifiers $R_{121}$, $R_{122}$, ..., $R_n$, $R_{131}$, $R_{132}$, ..., $R_m$, and $R_{141}$, $R_{142}$, ..., $R_r$, using at least one of an analog or digital signal. In some instances, the controller transmits the adjusted dv/dt protection parameter to the rectifier when the adjusted dv/dt protection parameter is determined. The adjusted dv/dt protection parameter may be transmitted back to the rectifier on the order of microseconds or, in some instances, on the order of tens of milliseconds inclusive of communication network latencies. In some instances, the controller transmits the adjusted dv/dt protection parameter to the rectifier based on further monitoring and analysis of voltage readings received from the rectifiers.

Each transmission of the adjusted dv/dt protection parameter updates a feedback loop associated with the rectifiers. For example, each rectifier is configured to receive adjusted dv/dt protection parameters from controller 150 and, upon receiving an adjusted parameter, to terminate the use of any previous parameters. Based on determining an adjusted dv/dt protection parameter, controller 150 feeds the adjusted dv/dt protection parameter forward into the rectifier feedback loop.

In some instances, the adjusted dv/dt protection parameter is used to train the feedforward control system. As described above, the feedforward control system uses one or more algorithms to correct and eliminate power anomalies that are detected in the power distribution system. One or more algorithms may cause the feedforward control system to correct and eliminate a detected power anomaly by adjusting the dv/dt protection parameter of the one or more rectifiers that detected the disturbance. The feedforward control system uses the adjusted dv/dt protection parameters and, in some instances, network conditions that correspond to respective dv/dt protection parameters to correct and eliminate disturbances.

Figure 2:
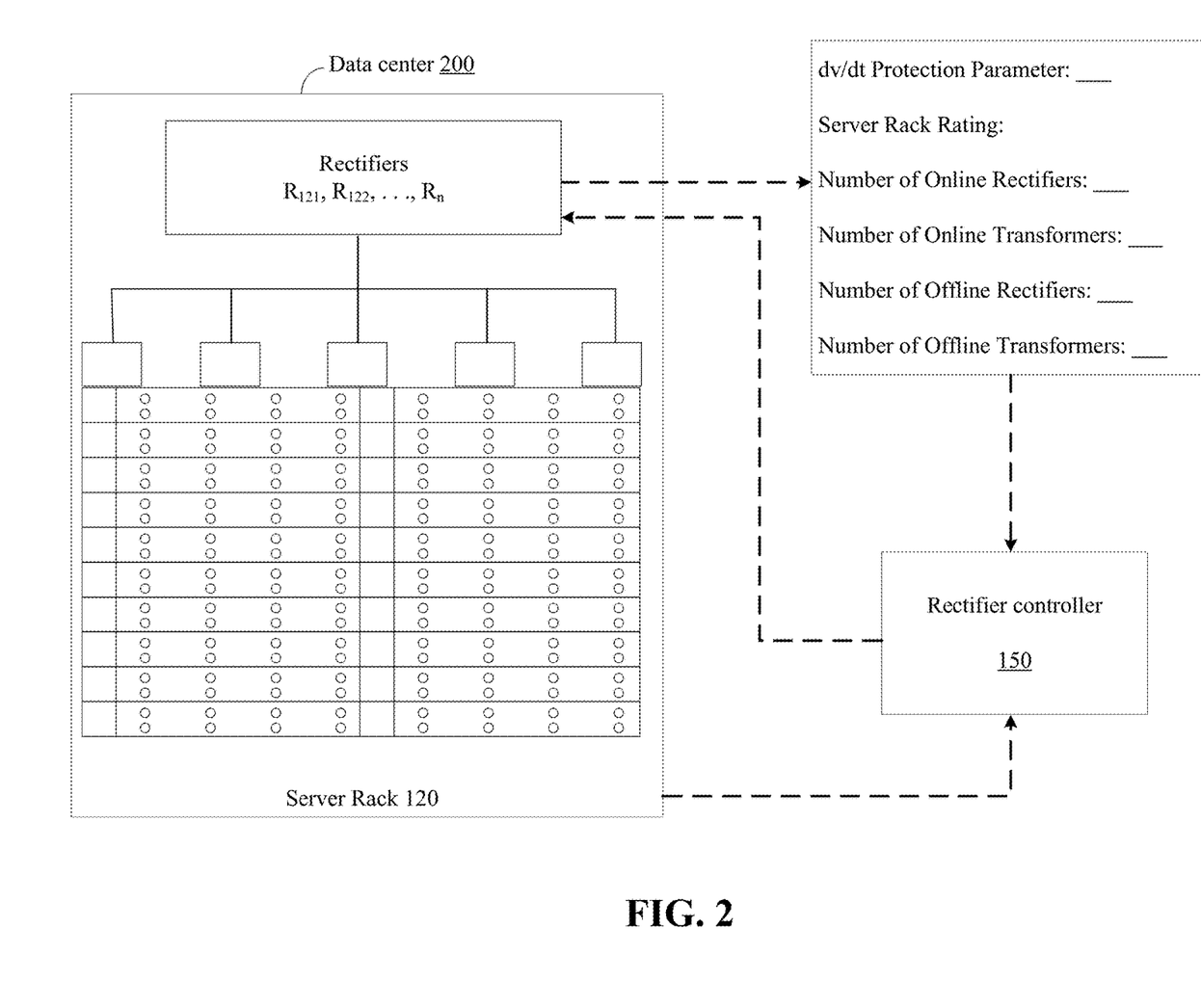
FIG. 2 illustrates example server rack information transmitted to a controller for control systems for mitigating rectifier caused power anomalies in data centers, in accordance with aspects of the disclosure.

FIG. 2 illustrates example server rack information that is transmitted to a controller for control systems for mitigating rectifier caused power anomalies in data centers. Rack 120 is illustrated in FIG. 2 for illustrative purposes only, not limitation as controller 150 may receive information from any of racks 120-140 and may transmit adjusted dv/dt protection parameters to any of the rectifiers associated with racks 120-140. Controller 150 may sense, from the rectifiers associated with rack 120, a current dv/dt protection parameter. The current dv/dt protection parameter may initially be based on vendor specifications as well as network conditions associated with the loads deployed on the corresponding rack, such as rack 120.

Controller 150 determines whether to adjust the current dv/dt protection parameter based on additional information that is sensed from the rectifiers associated with the rack. Controller 150 may determine a breaker status of one or more network components coupled to the rack. For example, controller 150 determines a number of online network components based on the information that is sensed from the rectifiers. For example, controller 150 determines a number of online rectifiers based on a number of detected rectifier readings. Controller 150 may determine a number of offline rectifiers based on detecting one or more rectifiers that are coupled to the rack, but are not associated with voltage readings. In some instances, controller 150 receives network component information based on sensing a breaker status of network components within the power distribution system, such as data center 200. Controller 150 determines, for each rack within the power distribution system, a number of network components that are online and a number of network components that are offline. The network components may include rectifiers, transformers, or the like.

Controller 150 compares the number of online network components and the number of offline network components to a threshold number of online network components and a threshold number of offline network components, respectively. Controller 150 uses an overall impedance determination to identify a number of online network components, such as rectifiers, that are needed to maintain the stability of the rack. Controller 150 identifies a range of effective system impedance and the number of online/offline rectifiers along with the number of online/offline transformers will create a specific value of system impedance. System impedance values are based on measured current and voltage at certain points within the system. The threshold number of online network components may indicate a minimum number of online network components that are needed to maintain the stability of the totality of rectifiers coupled to the rack. Based on determining that the number of online network components is equal to or greater than the threshold number of online network components, controller 150 determines that the stability of the rack is not impacted by the dv/dt protection parameter associated with a rectifier that repeatedly alerts of a voltage spike. In particular, controller 150 determines that the dv/dt protection parameters of the remaining online rectifiers protect the loads deployed on the rack such that the rectifier that, for example, repeatedly alerts of a voltage spike, does not affect the reliability and availability of the loads.

However, based on determining that the number of online network components is less than the threshold number of online network components, controller 150 determines that the stability of the rack is impacted by the dv/dt protection parameter of the rectifier in question and that the dv/dt protection parameter associated with the rectifier requires adjustment. In particular, controller 150 determines that the number of online rectifiers reduces the stability of the rack such that the current dv/dt protection parameter of the rectifier could affect the availability of the loads deployed on the rack.

In such instances, controller 150 dynamically adjusts the current dv/dt protection parameter based on network conditions associated with the rack. In particular, controller 150 determines how much a voltage reading of the rack should change over time in response to changed network conditions before the rectifier coupled to the rack alerts of a spike. In some instances, controller 150 dynamically adjusts the current dv/dt protection parameter based on the amount of voltage that the loads deployed on the rack are expected to pull from the data center. Controller 150 may use the rack rating to determine the network conditions. Controller 150 may determine the rack rating based on the information sensed from the rectifiers. In some instances, the rack rating may be indicated in the information that controller 150 receives from the rectifiers.

The rack rating may suggest an amount of voltage that loads are expected to use. A high density rack is typically expected to use more voltage than a low density rack. Controller 150 compares the rack rating to the amount of voltage that the rack, in totality, pulls from the power distribution system. If a low density rack pulls more voltage than is typically expected of low density racks, then controller 150 determines that the loads deployed on the rack may have changed and the rack transitioned from a low density rack to a high density rack. Based on the measured amount of voltage that the rack uses, controller 150 identifies an expected rate of change of voltage (dv/dt) that corresponds to the loads deployed on the high density rack. In some instances, controller 150 determines the expected dv/dt based on a new maximum amount of voltage that the high density rack is expected to use. Based on determining the expected dv/dt of the rack, controller 150 determines the adjusted dv/dt protection parameter that instructs the rectifier to trigger an alert when an actual dv/dt of the rack is faster than the expected dv/dt. In some instances, the adjusted dv/dt protection parameter is based on the new maximum amount of voltage that the rack is expected to use.

If a high density rack pulls less voltage than is typically expected of high density racks, then controller 150 determines that the loads deployed on the rack may have changed and that the rack transitioned from a high density rack to a low density rack. Based on the measure amount of voltage that the rack uses, controller 150 identifies an expected rate of change of voltage (dv/dt) that corresponds to the loads deployed on the low density rack. In some instances, controller 150 determines the expected dv/dt base on a new maximum amount of voltage that the low density rack is expected to use. Based on determining the expected dv/dt of the rack, controller 150 determines the adjusted dv/dt protection parameter that instructs the rectifier to trigger an alert when an actual dv/dt of the rack is faster than the expected dv/dt. In some instances, the adjusted dv/dt protection parameter is based on the new maximum amount of voltage that the rack is expected to use.

In some instances, the rack rating might not indicate a change in network conditions and controller 150 may use additional information from the rectifiers associated with the rack to determine whether to adjust the dv/dt protection parameters associated with the rectifiers. Controller 150 may use waveform readings that are generated based on the amount of voltage that each rack uses. Controller 150 receives the waveform readings from the plurality of rectifiers coupled to the rack, such as from rectifiers $R_{121}$, $R_{122}$, ..., $R_n$ associated with rack 120. In some instances, controller 150 receives the waveform readings from data center 200.

Figure 3:
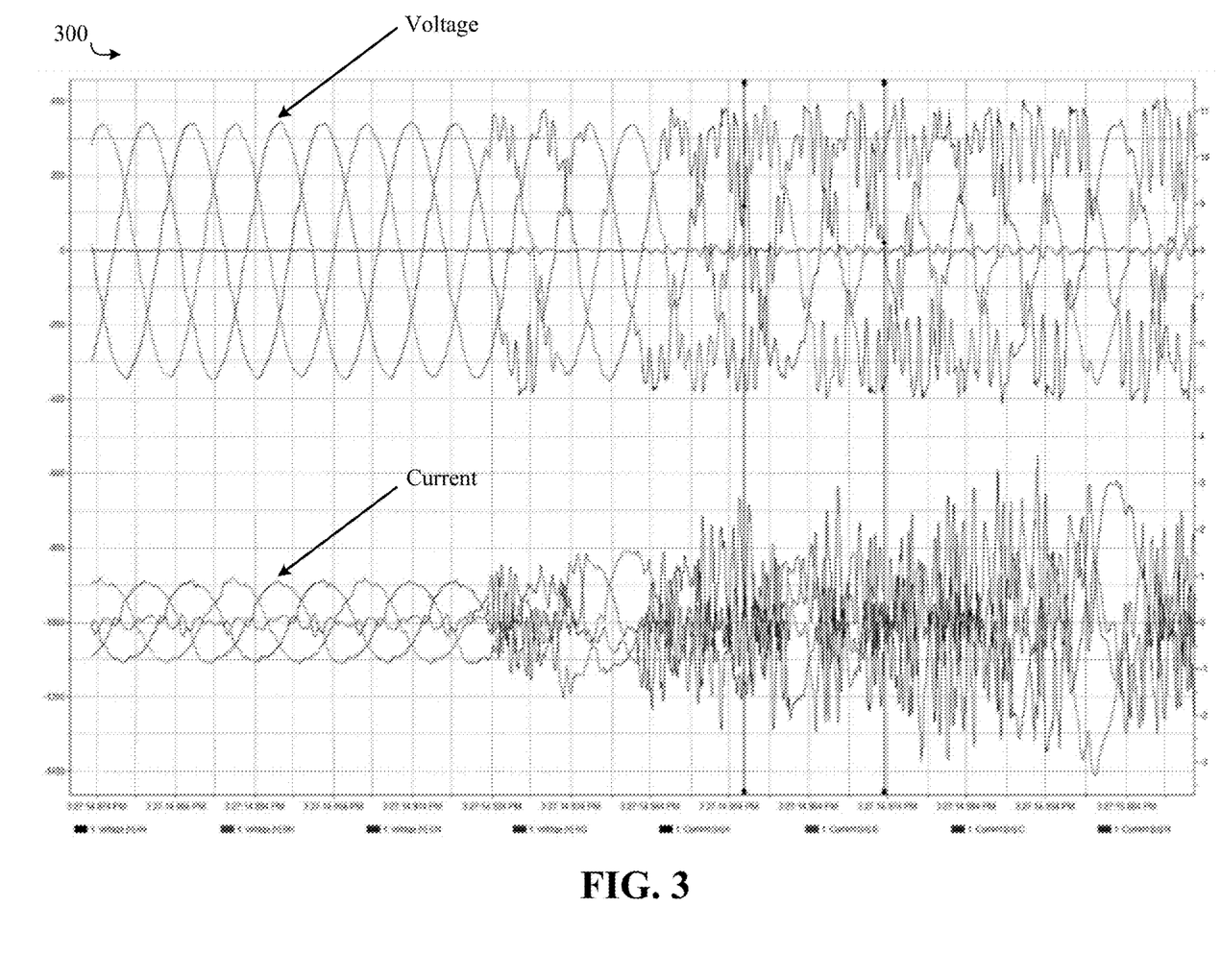
FIG. 3 illustrates an example waveform control systems for mitigating rectifier caused power anomalies in data centers, in accordance with aspects of the disclosure.

FIG. 3 illustrates example waveforms for control systems for mitigating rectifier caused power anomalies in data centers. FIG. 3 illustrates voltage (top) and current (bottom) readings associated with a rack. Controller 150 continuously receives such readings and continuously observes the waveforms to identify, correct, and eliminate power anomalies. In particular, controller 150 monitors the waveforms for power anomaly signatures that indicate the power distribution system is about to experience or is currently experiencing a power anomaly. In some instances, controller 150 identifies power anomalies by comparing the waveform oscillations of each period to identify specific instances where the waveform is different from what is typically expected. Waveforms may be different from an expected waveform when the rate of change of voltage over time (dv/dt) of the rack is faster than the expected dv/dt of the rack.

In some instances, the detection of such voltage spikes in the power distribution system causes controller 150 to detect a disturbance. Controller 150 uses the feedforward control system to monitor the power distribution system for additional parameters that are indicative of power anomaly signatures. Based on the feedforward control system detecting one or more parameters that indicate a power anomaly, controller 150 adjusts the dv/dt protection parameters of one or more rectifiers that detected the power anomaly.

The power anomaly signature may also include a sag/swell counter from power meters that experience a drastic increase over a pre-determined short time frame (e.g., meter counts increase from 3/4/5 events to 30/40/50 or more events in the pre-determined short time frame). The tenfold increase refers to a number of times a power meter detected a sag/swell event. The number of detected sag/swell events may, for example, increase tenfold during a power anomaly. Controller 150 uses the feedforward control system to monitor the power meter readings to determine whether the number of detected power events in the power distribution system increases by tenfold. Based on the feedforward control system determining that the number of detected power meter events increased tenfold, controller 150 corrects and eliminates the disturbance by adjusting the dv/dt protection parameter of the rectifiers coupled to the rack.

Figure 4:
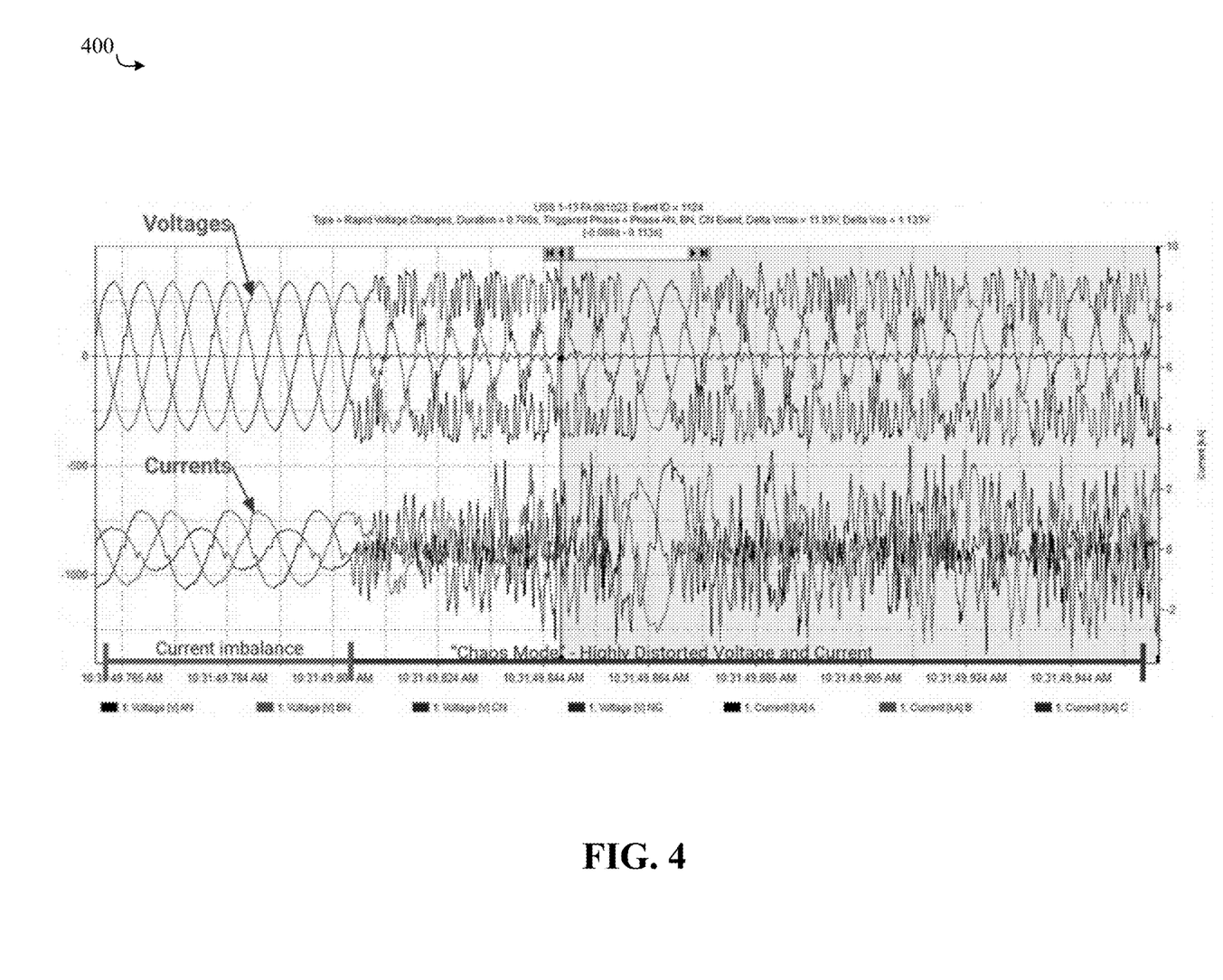
FIG. 4 illustrates an example waveform for control systems for mitigating rectifier caused power anomalies in data centers, in accordance with aspects of the disclosure.

The power anomaly signature may also include a significant current imbalance observed within the power system based on monitoring neutral current coming from protective relays. FIG. 4 illustrates an example waveform reading that indicates voltage readings before a power anomaly and voltage readings during a power anomaly. As illustrated in FIG. 4, a first portion of the graph represents a current imbalance associated with the rack, which leads to distorted voltage and current readings in a second portion of the graph. The first portion of the waveform corresponds to voltage and current readings before a power anomaly within the power distribution system. The second portion of the waveform corresponds to voltage and current readings during the power anomaly. Controller 150 uses the feedforward control system to analyze the waveforms received from the rectifiers to determine whether the received waveforms indicate the beginning of a power anomaly. Based on the feedforward control system determining that the waveform indicates that the power distribution system will soon experience the power anomaly or is currently experiencing the power anomaly, controller 150 adjusts the dv/dt protection parameters of the rectifiers coupled to the rack.

The power anomaly signature may also include excessive levels of harmonic distortion at multiple frequencies, flat lining of instantaneous phase currents (e.g., on the order of milliseconds) leading to a power anomaly, increases in neutral voltage, or the like. Controller 150 uses the feedforward control system to monitor the power distribution system for one or more of the parameters that may appear in a power anomaly signature. Based on the feedforward control system detecting one of the parameters, controller 150 adjusts dv/dt protection parameters. In some instances, controller 150 may adjust dv/dt protection parameters based on the feedforward control system detecting any combination of the parameters. Controller 150 uses the feedforward control system to determine whether a similar power anomaly signature is detected in the power distribution system at some time in the future.

Controller 150 uses the determination from the feedforward control system to adjust dv/dt protection parameters. Controller 150 analyzes the rectifiers that are coupled to the rack. In particular, controller 150 senses information from the rectifiers coupled to the rack and determines whether the current dv/dt protection parameters associated with the rectifiers secure the stability of the rack and the loads deployed on the rack. Controller 150 may perform the analysis described in connection with FIG. 2 to determine whether to sensitize or desensitize the dv/dt protection parameters.

For example, controller 150 determines that a rack experiences a distorted rate of change of voltage usage over time based on the current imbalance illustrated in FIG. 4. Controller 150 reads the actual rate of change of voltage of the rack and the expected rate of change of voltage of the rack and, based on a comparison, determines that the dv/dt protection parameter is set too high. Therefore, the actual rate of change of voltage is not fast enough to trigger the dv/dt protection parameter. Therefore, controller 150 sensitizes the dv/dt protection parameter to enable the rectifier to detect a rate of change of voltage within a smaller range than the range associated with the previous dv/dt protection parameter.

Returning to the discussion of FIG. 2, controller 150 transmits the adjusted dv/dt protection parameter to the corresponding rectifier coupled to the rack, such as one or more of rectifiers $R_{121}$, $R_{122}$, ..., $R_n$ coupled to rack 120. In some instances, controller 150 transmits the adjusted dv/dt protection parameter to the rectifier when the adjusted dv/dt protection parameter is determined. When doing so, controller 150 continuously retrieves and monitors the information sensed from the rectifier to determine whether to further adjust the dv/dt protection parameter to protect the rack from transient surges. For example, controller 150 continuously monitors the number of online network components, the number of offline network components, additional loads that are deployed in the data center, the power consumption of the additional loads that are deployed in the data center, or the like.

Figure 5:
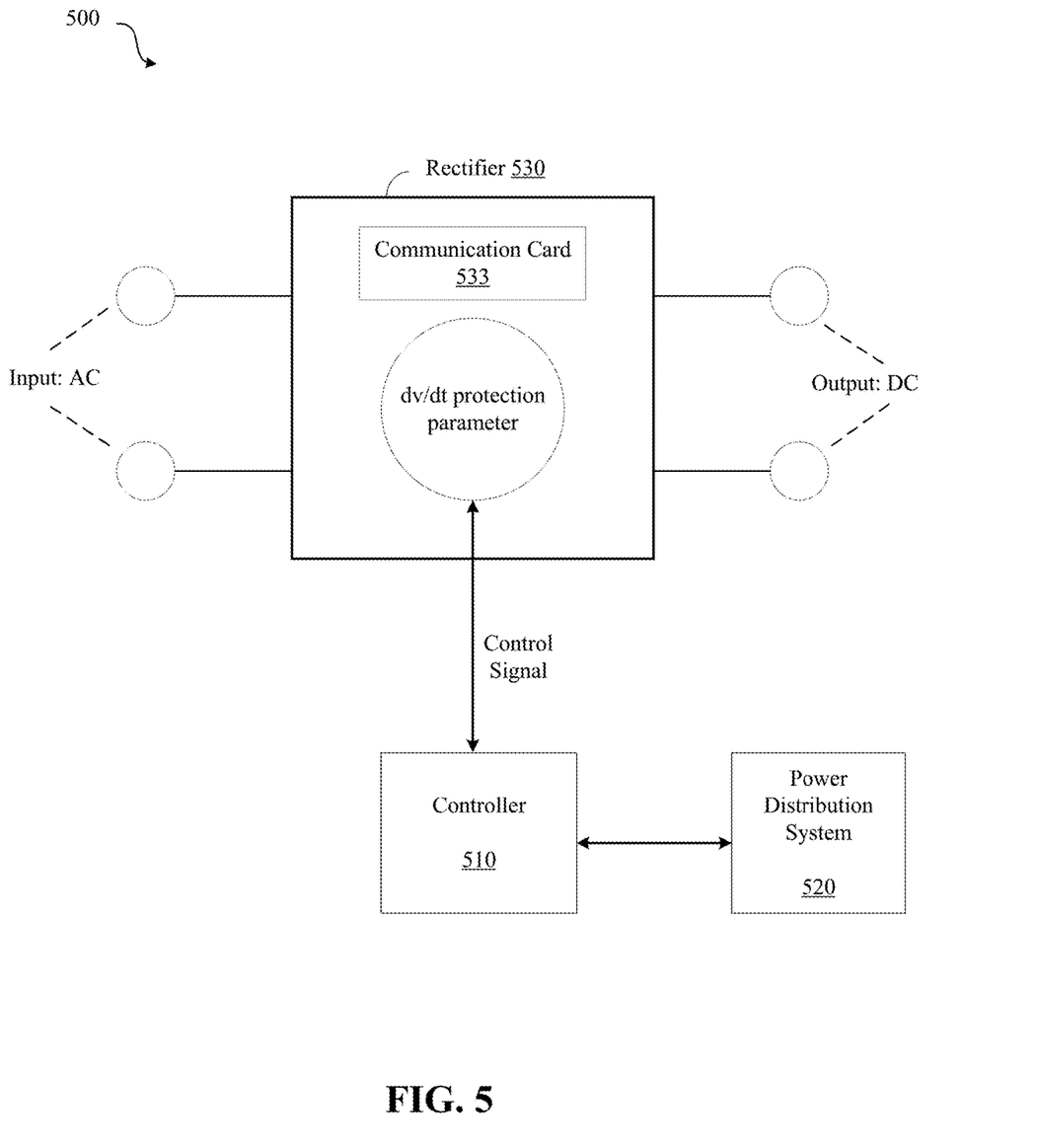
FIG. 5 illustrates an example rectifier for control systems for mitigating rectifier caused power anomalies in data centers, in accordance with aspects of the disclosure.

In some instances, controller 150 uses the feedforward control system to continuously monitor the power distribution system for one or more parameters that are indicative of a power anomaly signature. In such instances, controller 150 adjusts the dv/dt protection parameters associated with the rectifiers when the feedforward control detects a power anomaly signature. For example, based on the feedforward control system indicating the one or more parameters that are indicative of a power anomaly signature are detected within the power distribution system, controller 150 performs the analysis described in connection with FIG. 2 to determine whether to sensitize or desensitize the dv/dt protection parameters. Controller transmits the adjusted dv/dt protection parameters to the corresponding rectifiers to stop the power anomaly FIG. 5 illustrates an example rectifier for control systems for mitigating rectifier caused power anomalies in data centers. In particular, FIG. 5 illustrates rectifier 530 that receives control signals from controller 510 to adjust a rate of change of voltage (dv/dt) protection parameter stored in rectifier 530 based on information that controller 510 senses from power distribution system 520. Power distribution system 520 may be a data center that houses one or more racks. Each rack includes one or more servers that host one or more loads. One or more rectifiers are coupled to each rack. A rectifier coupled to the rack senses the amount of voltage that rack pulls from the power distribution system. The rectifier also senses a rate of change of the voltage over time (dv/dt). A dv/dt protection parameter is a value associated with the rate of change of voltage that indicates how quickly the rate of change of voltage should change.

If the rectifier determines that the rate of change of voltage used by the rack changes faster than the dv/dt protection parameter allows, the rectifier treats that as an anomaly. When the rectifier detects a change that is outside the allowed window of the dv/dt parameter, the controller analyzes the totality of voltage readings from the rectifier to determine whether to sensitize or desensitize the dv/dt protection parameter. The controller adjusts the dv/dt protection parameter accordingly and transmits an adjusted dv/dt protection parameter to the rectifier.

While rectifiers are typically located in power distribution system 520, rectifier 530 is depicted outside of power distribution system 520 solely to illustrate how dv/dt protection parameters are dynamically adjusted.

In some instances, power distribution system 520 transmits system information to controller 510. The system information may indicate the totality of voltage readings from the rectifiers coupled to the racks therein, a number of online network components, a number of offline network components, or the like. In some instances, controller 510 senses this information from power distribution system 520.

Controller 510 uses the system information to determine whether to adjust the dv/dt protection parameter associated with a rectifier, as described in connection with FIG. 2. Controller 510 may read the current dv/dt protection parameter from rectifier 530. Further, as discussed in connection with FIG. 4, controller 510 adjusts the current dv/dt protection parameter based on the feedforward control system indicating that a power anomaly is detected in the power distribution system.

Controller 510 transmits a control signal to the rectifier, such as example rectifier 530. The control signal may be an analog signal or a digital signal, and contains the adjusted dv/dt protection parameter associated with the rectifier.

Rectifier 530 receives the control signal from controller 510 and adjusts its dv/dt protection parameter. In particular, rectifier 530 uses the adjusted dv/dt protection parameter to analyze an expected rate of change of voltage of the rack. The dv/dt protection parameter associated with rectifier 530 is not a static value, but can be adjusted based on changes in network conditions associated with the rack. Rectifier 530 is configured to adapt to the changes in network conditions by using dynamically adjusted dv/dt protection parameters to determine when to alert the power distribution system of a power event, such as a voltage spike.

Rectifier 530 includes one or more internal components that are used to dynamically adjust the dv/dt protection parameter. For example, rectifier 530 includes communication card 533, firmware (not illustrated in FIG. 5), and software (not illustrated in FIG. 5). The described process of dynamically adjusting the dv/dt protection parameter may be implemented in at least one of the rectifier firmware, software, or hardware. For example, with respect to implementing the described process using hardware, rectifier 530 may receive hardwired analog signals (for example, +/−10V inputs or 4-20 mA inputs). The hardwired analog signals may include the control signal, as illustrated in FIG. 5.

Figure 6:
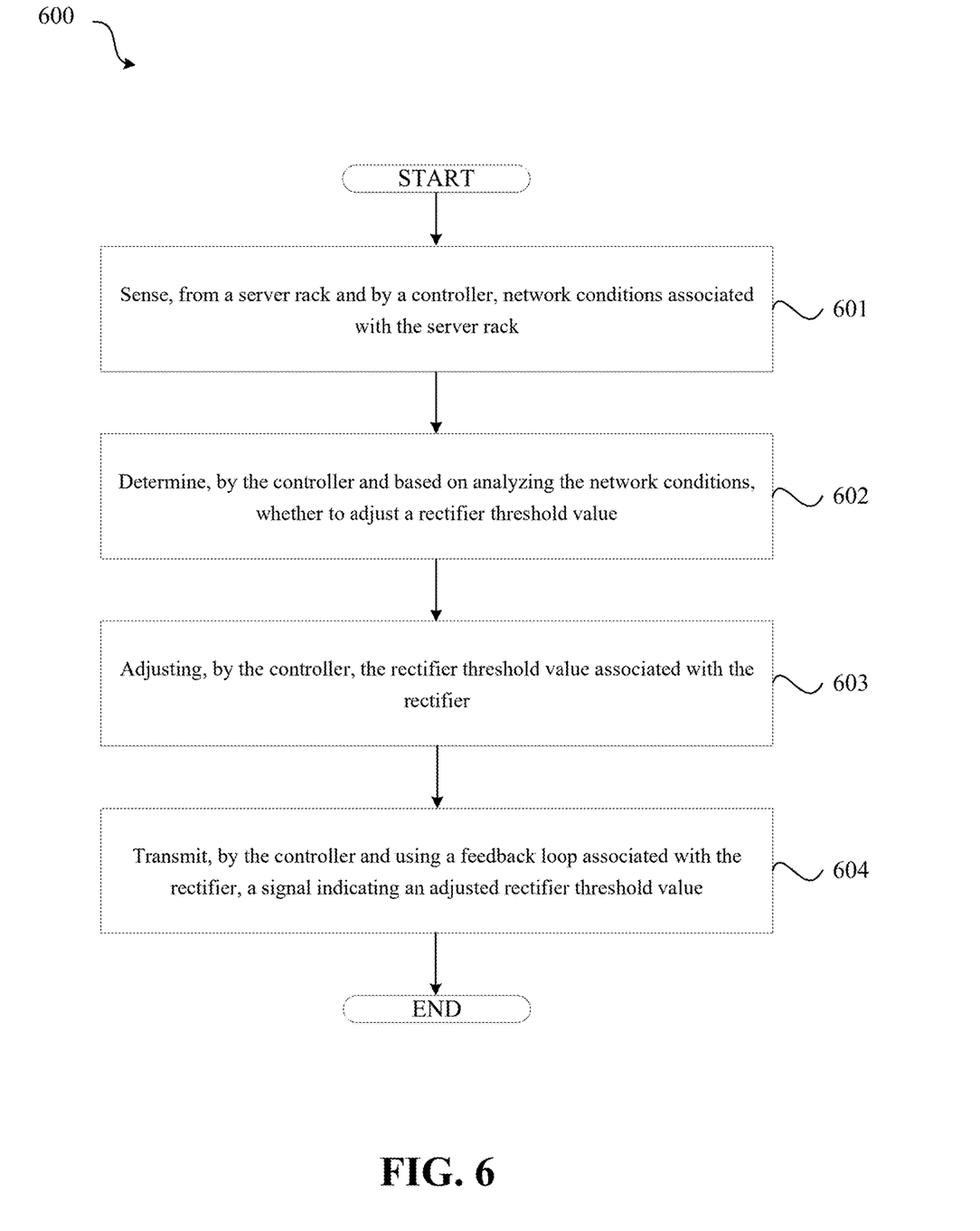
FIG. 6 illustrates a flow diagram for an example method for control systems for mitigating rectifier caused power anomalies in data centers, in accordance with aspects of the disclosure.

FIG. 6 illustrates a flow diagram for an example method for mitigating power anomalies in data centers based on dynamic rectifier threshold values. The operations described herein are presented in the current order by way of example, and the order is not meant to be limiting. Moreover, operations may be omitted from or added to the example method.

At block 601, a controller senses, from a server rack, network conditions associated with the rack. Controller 150 is coupled to one or more rectifiers that are coupled to the rack. The current description describes adjusting a rate of change of voltage protection of one rectifier. However, controller 150 may adjust the rates of change of voltage protection of one or more rectifiers in parallel.

Controller 150 senses, from a rectifier coupled to the rack, a density rating of the rack, a number of online network components that are coupled to the stack, a number of offline network components that are coupled to the stack, and the rate of change of voltage protection associated with a rectifier.

At block 602, the controller determines, based on analyzing the network conditions, whether to adjust the rate of change of voltage protection associated with the rectifier. Controller 150 senses, via the rectifier, an amount of voltage that the rack uses to maintain the reliability and availability of the loads deployed on the rack. Controller 150 compares the amount of voltage used to an expected voltage usage. Based on determining that the amount of voltage used is different from the expected voltage usage, controller 150 determines that the density of the rack changed. Based on determining the density of the rack changed, controller 150 adjusts the rate of change of voltage protection accordingly.

Controller 150 also analyzes the number of online/offline components to determine whether to adjust the rate of change of voltage protection. Controller 150 compares the number of online/offline network components to a threshold number of online/offline network components to determine whether the number of online/offline network components threaten the stability of the rack and the loads deployed on the rack. For example, based on determining that the number of online network components is less than the threshold number of online network components, controller 150 may increase the sensitivity of the rate of change of voltage protection such that the rectifier is desensitized.

In some instances, controller 150 further analyzes the network conditions of the rack based on analyzing one or more waveform readings retrieved from the rectifier. Controller 150 continuously monitors the waveform readings to identify power anomaly signatures and to adjust the rate of change of voltage protection accordingly.

At block 603, the controller adjusts the rate of change of voltage protection associated with the rectifier. Controller 150 sensitizes or desensitizes the rate of change of voltage protection based on changes to the amount of voltage that the rack is expected to pull from a data center. In some instances, controller 150 sensitizes the rate of change of voltage protection. Sensitizing the rate of change of voltage protection includes decreasing the rate of change of voltage protection. Further, in some instances, controller 150 desensitizes the rate of change of voltage protection. Desensitizing the rate of change of voltage protection includes increasing the rate of change of voltage protection.

At block 604, the controller transmits, to the rectifier, a signal indicating an adjusted rate of change of voltage protection. In some instances, controller 150 transmits the adjusted rate of change of voltage protection when the adjusted rectifier threshold value is determined. However, in some instances, controller 150 transmits an adjusted rate of change of voltage protection based on further analysis of one or more waveforms depicting voltage and current usage of the rack.

Figure 7:
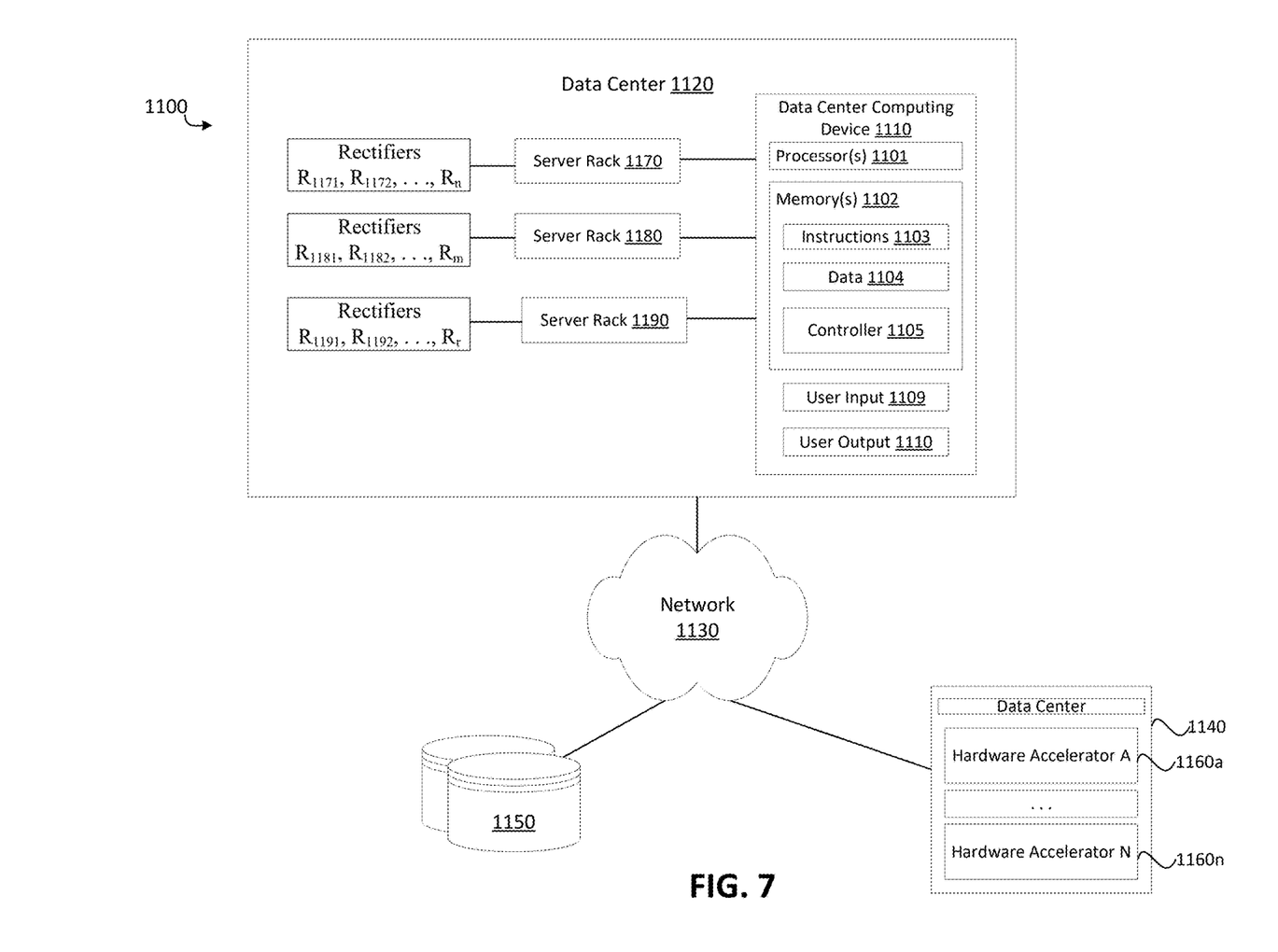
FIG. 7 illustrates a block diagram of an example computing environment for control systems for mitigating rectifier caused power anomalies in data centers, in accordance with aspects of the disclosure.

FIG. 7 illustrates a block diagram of an example computing environment for mitigating power anomalies in data centers based on dynamic rectifier threshold values. Mitigating power anomalies in data centers based on dynamic rectifier threshold values may require one or more computing devices within the data center, where the computing devices may be configured to interface with server racks within the data center via a cloud network. For example, the data center network may include data center computing device 1110, which may be located within a data center such as data center 1120. Data center computing device 1110 may be communicatively coupled to one or more storage devices over a network. The storage devices may be a combination of volatile and non-volatile memory and may be at the same or different physical locations than the computing devices. For example, the storage devices may include any type of non-transitory computer readable medium capable of storing information, such as a hard-drive, solid state drive, tape drive, optical storage, memory card, ROM, RAM, DVD, CD-ROM, write-capable, and read-only memories.

As illustrated in FIG. 7, data center computing device 1110 may be located within data center 1120. Data center 1120 may store a plurality of data center components, such as the data center computing device, a plurality of server racks, and one or more rectifiers coupled to each server rack. While three server racks are illustrated within data center 1120, data center 1120 may include more or fewer than three server racks.

Data center computing device 1110 may include one or more processors and memory, such as processor(s) 1101 and memory(s) 1102 (referred to herein as memory 1102). Memory(s) 1102 may include instructions 1103, data 1104, and controller 1105. Data center computing device 1110 may also include a user input and a user output, such as user input 1109 and user output 1110.

Memory 1102 may store information accessible by the processors, including instructions that may be executed by the processors. Memory 1102 may also include data that may be read, retrieved, manipulated, or stored by the processors. Memory 1102 may be a type of non-transitory computer readable medium capable of storing information accessible by the processors, such as volatile and non-volatile memory. The processors may include one or more central processing units (CPUs), graphic processing units (GPUs), field-programmable gate arrays (FPGAs), and/or application-specific integrated circuits (ASICs), such as tensor processing units (TPUs).

Instructions 1103 may include one or more instructions that, when executed by the processors, cause the one or more processors to perform actions defined by the instructions. Instructions 1103 may be stored in object code format for direct processing by the processors, or in other formats including interpretable scripts or collections of independent source code modules that are interpreted on demand or compiled in advance. Instructions 1103 may include instructions for mitigating power anomalies in data centers based on dynamic rectifier threshold values.

Data 1104 may be read, retrieved, stored, or modified by the processors in accordance with the instructions. Data 1104 may be stored in computer registers, in a relational or non-relational database as a table having a plurality of different fields and records, or as JSON, YAML, proto, or XML documents. Data 1104 may also be formatted in a computer-readable format such as, but not limited to, binary values, ASCII, or Unicode. Moreover, data 1104 may include information sufficient to identify relevant information, such as numbers, descriptive text, proprietary codes, pointers, references to data stored in other memories, including other network locations, or information that is used by a function to calculate relevant data.

Controller 1105 may be configured to interface with one or more server racks associated with the data center. Controller 1105 may sense rack information from one or more rectifiers coupled to the rack. Controller 1105 may analyze network conditions associated with the rack and may determine, based on an amount of voltage that the rack uses, whether to adjust rectifier threshold values associated with the one or more rectifiers coupled to the rack.

User input 1109 may include any appropriate mechanism or technique for receiving input, such as keyboard, mouse, mechanical actuators, soft actuators, touchscreens, microphones, and sensors. In some implementations, user input 1109 may be used to receive notifications indicating successful optimization of energy usage within data centers.

User output 1110 may be used to display the one or more defined interfaces and APIs within which the control algorithms may be executed.

Although FIG. 7 illustrates the processors and the memories as being within the computing devices, components described herein can include multiple processors and memories that can operate in different physical locations and not within the same computing device. For example, some of the instructions and the data can be stored on a removable SD card and others within a read-only computer chip. Some or all of the instructions and data can be stored in a location physically remote from, yet still accessible by, the processors. Similarly, the processors can include a collection of processors that can perform concurrent and/or sequential operation. The computing devices can each include one or more internal clocks providing timing information, which can be used for time measurement for operations and programs run by the computing devices.

Data center computing device 1110 may be connected over network 1130 to a data center housing any number of hardware accelerators, such as data center 1140 housing hardware accelerators 1160*a*-1160*n*. Data center 1140 can be one of multiple data centers or other facilities in which various types of computing devices, such as hardware accelerators, are located. Computing resources housed in the data center can be specified for controlling energy usage in data centers, as described herein.

The information that controller 1105 retrieves from the one or more rectifiers may be stored in database 1150. Further, previously adjusted rectified threshold values may be stored in database 150.

Data center computing device 1110, data center 1140, server racks 1170-1190, and rectifiers $R_{1171}, R_{1172}, \ldots, R_n$, $R_{1181}, R_{1182}, \ldots, R_m$, and $R_{1191}, R_{1192}, \ldots, R_r$ may be capable of direct and indirect communication over network 1130. For example, using a network socket, data center computing device 1110 may connect to a service operating in data center 1140 through an Internet protocol. Data center computing device 1110 may set up listening sockets that may accept an initiating connection for sending and receiving information.

Network 1130 itself may include various configurations and protocols including the Internet, World Wide Web, intranets, virtual private networks, wide area networks, local networks, and private networks using communication protocols proprietary to one or more companies. Network 1130 may support a variety of short- and long-range connections. The short- and long-range connections may be made over different bandwidths, such as 2.402 GHz to 2.480 GHz, commonly associated with the Bluetooth® standard, 2.4 GHz and 5 GHz, commonly associated with the Wi-Fi® communication protocol; or with a variety of communication standards, such as the LTE® standard for wireless broadband communication. Network 630 may, in addition or alternatively, also support wired connections between the devices and the data center, including over various types of Ethernet connection.

It is understood that the aspects of the disclosure may be implemented according to a variety of different configurations and quantities of computing devices, including in paradigms for sequential or parallel processing, or over a distributed network of multiple devices.

Aspects of the disclosed technology may take the form of a method, process, apparatus, system, or power distribution network. Those examples may include one or more of the following features (e.g., F1 through F20):

F1. A system for adjusting a rate of change of voltage protection associated with a rectifier, the system comprising:
the rectifier coupled to a server rack;
a controller coupled to the rectifier and operable to:
sense, from the server rack, network conditions associated with the server rack;
determine, based on analyzing the network conditions, whether to adjust the rate of change of voltage protection;
adjust the rate of change of voltage protection associated with the rectifier; and
transmit, to the rectifier, a signal indicating an adjusted rate of change of voltage protection.

F2. The system of F1, wherein the network conditions comprise one or more of:
the rate of change of voltage protection associated with the rectifier;
a state of network components associated with the server rack; and
a density rating of the server rack.

F3. The system of any one of F1 to F2, wherein the density rating of the server rack indicates an amount of voltage that loads deployed on the server rack are expected to use.

F4. The system of any one of F1 to F3, wherein the state of the network components associated with the server rack comprise one or more of:
a number of online network components that are coupled to the server rack; and
a number of offline network components that are coupled to the server rack,
wherein the network components correspond to transformers and different rectifiers.

F5. The system of any one of F1 to F4, wherein adjusting the rate of change of voltage protection associated with the rectifier further causes the controller to:
determine whether an amount of voltage used by the server rack increases over time; and
based on determining the amount of voltage used by the server rack increases over time, increase the rate of change of voltage protection.

F6. The system of any one of F1 to F5, wherein adjusting the rate of change of voltage protection associated with the rectifier further causes the controller to, based on determining the amount of voltage used by the server rack decreases over time, decrease the rate of change of voltage protection.

F7. The system of any one of F1 to F6, wherein the rate of change of voltage protection indicates a measure on a rate of change of voltage over a unit of time that the rectifier detects as a power anomaly.

F8. The system of any one of F1 to F7, wherein the rectifier is configured to:
receive, from the controller, the rate of change of voltage protection; and
stop, using the adjusted rate of change of voltage protection, one or more power anomalies within the system.

F9. The system of any one of F1 to F8, wherein the controller is further configured to detect, using a feedforward control system, one or more parameters that are indicative of a power anomaly signature.

F10. The system of any one of F1 to F9, wherein the controller is further configured to adjust the rate of change of voltage protection based on detecting the power anomaly signature.

F11. A method for adjusting a rate of change of voltage protection associated with a rectifier, the method comprising:
sensing, by a controller, network conditions associated with a server rack;
determining, by the controller and based on the network conditions, whether to adjust the rate of change of voltage protection;

adjusting, by the controller, the rate of change of voltage protection associated with the rectifier; and transmitting, to the rectifier, a signal indicating an adjusted rate of change of voltage protection.

F12. The method of F11, wherein the network conditions comprise one or more of:

the rate of change of voltage protection associated with the rectifier;

a density rating of the server rack;

a number of online network components that are coupled to the server rack; and a number of offline network components that are coupled to the server rack, wherein the network components correspond to transformers and different rectifiers.

F13. The method of any one of F11 to F12, wherein adjusting the rate of change of voltage protection further comprises:

determining, by the controller, whether an amount of voltage used by the server rack increases over time; and based on determining the amount of voltage used by the server rack increases over time, increasing, by the controller, the rate of change of voltage protection.

F14. The method of any one of F11 to F13, wherein adjusting the rate of change of voltage protection associated with the rectifier further comprises, based on determining the amount of voltage used by the server rack decreases over time, decreasing, by the controller, the rate of change of voltage protection.

F15. The method of any one of F11 to F14, further comprising detecting, by the controller and using a feedforward control system, one or more parameters that are indicative of a power anomaly signature.

F16. The method of any one of F11 to F15, wherein adjusting the rate of change of voltage protection is based on detecting, by the controller, the power anomaly signature.

F17. A power distribution network comprising:

one or more rectifiers coupled to a server rack, each rectifier having a rate of change of voltage protection; and a controller coupled to the one or more rectifiers, the controller configured to:

sense, from the server rack, network conditions associated with the server rack;

determine, based on analyzing the network conditions, whether to adjust the rate of change of voltage protection;

adjust the rate of change of voltage protection associated with the rectifier; and transmit, to the rectifier, a signal indicating an adjusted rate of change of voltage protection.

F18. The power distribution network of F17, wherein adjusting the rate of change of voltage protection associated with the rectifier further causes the controller to:

determine whether an amount of voltage used by the server rack increases over time; and based on determining the amount of voltage used by the server rack increases over time, increase the rate of change of voltage protection.

F19. The power distribution network of any one of F17 to F18, wherein adjusting the rate of change of voltage protection associated with the rectifier further causes the controller to, based on determining the amount of voltage used by the server rack decreases over time, decrease the rate of change of voltage protection.

F20. The power distribution network of any one of F17 to F19, wherein a density rating of the server rack indicates an amount of voltage that loads deployed on the server rack are expected to use.

Aspects of this disclosure can be implemented in digital electronic circuitry, in tangibly-embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, that is generated to encode information for transmission to suitable receiver apparatus for execution by a data processing apparatus.

The term "configured" is used herein in connection with systems and computer program components. For a system of one or more computers to be configured to perform particular operations or actions means that the system has installed on it software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "data processing apparatus" refers to data processing hardware and encompasses various apparatus, devices, and machines for processing data, including programmable processors, a computer, or combinations thereof. The data processing apparatus can include special purpose logic circuitry, such as a field programmable gate array (FPGA) or an application specific integrated circuit (ASIC). The data processing apparatus can include code that creates an execution environment for computer programs, such as code that constitutes processor firmware, a protocol stack, a database management system, an operating system, or combinations thereof.

The data processing apparatus can include special-purpose hardware accelerator units for implementing machine learning models to process common and compute-intensive parts of machine learning training or production, such as inference or workloads. Machine learning models can be implemented and deployed using one or more machine learning frameworks.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a standalone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" refers to a software-based system, subsystem, or process that is programmed to perform one or more specific functions. The engine can be implemented as one or more software modules or components, or can be installed on one or more computers in one or more locations. A particular engine can have one or more computers dedicated thereto, or multiple engines can be installed and running on the same computer or computers.

The processes and logic flows described herein can be performed by one or more computers or special purpose logic circuitry, such as a system on chip (SoC) executing one or more computer programs to perform functions by operating on input data and generating output data. The processes and logic flows can also be performed by special purpose logic circuitry, or by a combination of special purpose logic circuitry and one or more computers.

A computer or special purpose logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a personal digital assistant (PDA), a mobile audio or video player, a game console, a Global Positioning System (GPS), or a portable storage device, e.g., a universal serial bus (USB) flash drive, as examples.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back-end component, e.g., as a data server, a middleware component, e.g., an application server, or a front end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the implementations should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A system for adjusting a rate of change of voltage protection associated with a rectifier, the system comprising:
   the rectifier coupled to a server rack;
   a controller coupled to the rectifier and operable to:
      sense, from the server rack, network conditions associated with the server rack;
      determine, based on analyzing the network conditions, whether to adjust the rate of change of voltage protection;
      adjust the rate of change of voltage protection associated with the rectifier by changing a threshold value for a change in voltage over unit time, wherein a rate of change of voltage exceeding the threshold value is considered an anomaly; and
      transmit, to the rectifier, a signal indicating an adjusted rate of change of voltage protection.

2. The system of claim 1, wherein the network conditions comprise one or more of:
   the rate of change of voltage protection associated with the rectifier;
   a state of network components associated with the server rack; and
   a density rating of the server rack.

3. The system of claim 2, wherein the density rating of the server rack indicates an amount of voltage that loads deployed on the server rack are expected to use.

4. The system of claim 2, wherein the state of the network components associated with the server rack comprise one or more of:
   a number of online network components that are coupled to the server rack; and
   a number of offline network components that are coupled to the server rack,
   wherein the network components correspond to transformers and different rectifiers.

5. The system of claim 1, wherein adjusting the rate of change of voltage protection associated with the rectifier further causes the controller to:
   determine whether an amount of voltage used by the server rack increases over time; and based on determining the amount of voltage used by the server rack increases over time, increase the rate of change of voltage protection.

6. The system of claim 5, wherein adjusting the rate of change of voltage protection associated with the rectifier further causes the controller to, based on determining the amount of voltage used by the server rack decreases over time, decrease the rate of change of voltage protection.

7. The system of claim 1, wherein the rate of change of voltage protection indicates a measure on a rate of change of voltage over a unit of time that the rectifier detects as a power anomaly.

8. The system of claim 1, wherein the rectifier is configured to:
receive, from the controller, the rate of change of voltage protection; and
stop, using the adjusted rate of change of voltage protection, one or more power anomalies within the system.

9. The system of claim 1, wherein the controller is further configured to detect, using a feedforward control system, one or more parameters that are indicative of a power anomaly signature.

10. The system of claim 9, wherein the controller is further configured to adjust the rate of change of voltage protection based on detecting the power anomaly signature.

11. A method for adjusting a rate of change of voltage protection associated with a rectifier, the method comprising:
sensing, by a controller, network conditions associated with a server rack;
determining, by the controller and based on the network conditions, whether to adjust the rate of change of voltage protection;
adjusting, by the controller, the rate of change of voltage protection associated with the rectifier by changing a threshold value for a change in voltage over unit time, wherein a rate of change of voltage exceeding the threshold value is considered an anomaly; and
transmitting to the rectifier a signal indicating an adjusted rate of change of voltage protection.

12. The method of claim 11, wherein the network conditions comprise one or more of:
the rate of change of voltage protection associated with the rectifier;
a density rating of the server rack;
a number of online network components that are coupled to the server rack; and
a number of offline network components that are coupled to the server rack,
wherein the network components correspond to transformers and different rectifiers.

13. The method of claim 12, wherein adjusting the rate of change of voltage protection further comprises:
determining, by the controller, whether an amount of voltage used by the server rack increases over time; and
based on determining the amount of voltage used by the server rack increases over time, increasing, by the controller, the rate of change of voltage protection.

14. The method of claim 13, wherein adjusting the rate of change of voltage protection associated with the rectifier further comprises, based on determining the amount of voltage used by the server rack decreases over time, decreasing, by the controller, the rate of change of voltage protection.

15. The method of claim 12, further comprising detecting, by the controller and using a feedforward control system, one or more parameters that are indicative of a power anomaly signature.

16. The method of claim 15, wherein adjusting the rate of change of voltage protection is based on detecting, by the controller, the power anomaly signature.

17. A power distribution network comprising:
one or more rectifiers coupled to a server rack, each rectifier having a rate of change of voltage protection; and
a controller coupled to the one or more rectifiers, the controller configured to:
sense, from the server rack, network conditions associated with the server rack;
determine, based on analyzing the network conditions, whether to adjust the rate of change of voltage protection;
adjust the rate of change of voltage protection associated with the rectifier by changing a threshold value for a change in voltage over unit time, wherein a rate of change of voltage exceeding the threshold value is considered an anomaly; and
transmit, to the rectifier, a signal indicating an adjusted rate of change of voltage protection.

18. The power distribution network of claim 17, wherein adjusting the rate of change of voltage protection associated with the rectifier further causes the controller to:
determine whether an amount of voltage used by the server rack increases over time; and
based on determining the amount of voltage used by the server rack increases over time, increase the rate of change of voltage protection.

19. The power distribution network of claim 18, wherein adjusting the rate of change of voltage protection associated with the rectifier further causes the controller to, based on determining the amount of voltage used by the server rack decreases over time, decrease the rate of change of voltage protection.

20. The power distribution network of claim 17, wherein a density rating of the server rack indicates an amount of voltage that loads deployed on the server rack are expected to use.

* * * * *